(12) United States Patent
Berger et al.

(10) Patent No.: US 7,694,506 B2
(45) Date of Patent: Apr. 13, 2010

(54) METHOD FOR DIAGNOSING THE DEGREE OF AGING OF A CATALYTIC CONVERTER DISPOSED IN THE EXHAUST GAS CHANNEL OF AN INTERNAL COMBUSTION ENGINE

(75) Inventors: Ulrich Berger, Gifhorn (DE); Stefan Lappe, Wasbüttel (DE); Olaf Wilkens, Braunschweig (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 630 days.

(21) Appl. No.: 11/596,049

(22) PCT Filed: Feb. 1, 2006

(86) PCT No.: PCT/DE2006/000167

§ 371 (c)(1),
(2), (4) Date: Nov. 9, 2006

(87) PCT Pub. No.: WO2006/081809

PCT Pub. Date: Aug. 10, 2006

(65) Prior Publication Data
US 2007/0220961 A1    Sep. 27, 2007

(30) Foreign Application Priority Data
Feb. 2, 2005 (DE) .................. 10 2005 004 670

(51) Int. Cl.
*F01N 3/00* (2006.01)
(52) U.S. Cl. ............... 60/274; 60/277; 60/285
(58) Field of Classification Search ........... 60/274, 60/277
See application file for complete search history.

(56) References Cited

U.S. PATENT DOCUMENTS

| 5,437,154 | A | * | 8/1995 | Sato et al. ............ 60/276 |
| 5,732,551 | A | * | 3/1998 | Naber et al. .......... 60/274 |
| 5,761,901 | A | * | 6/1998 | Staufenberg et al. ... 60/274 |
| 5,906,959 | A | * | 5/1999 | Yamasita et al. ...... 502/328 |
| 6,119,447 | A | * | 9/2000 | Eriksson et al. ....... 60/274 |
| 6,195,986 | B1 | * | 3/2001 | Davey et al. ......... 60/274 |
| 6,216,448 | B1 | | 4/2001 | Schnaibel et al. |
| 6,351,943 | B1 | * | 3/2002 | Tagami et al. ........ 60/285 |
| 6,499,290 | B1 | | 12/2002 | Nakamura et al. |
| 2004/0139732 | A1 | | 7/2004 | Wang et al. |
| 2005/0204804 | A1 | | 9/2005 | Weinowski et al. |

FOREIGN PATENT DOCUMENTS

| DE | 42 11 116 | 10/1993 |
| DE | 198 01 626 | 7/1999 |
| DE | 199 53 601 | 5/2001 |
| DE | 101 37 134 | 2/2003 |
| DE | 103 05 452 | 7/2004 |
| WO | WO 2004/007922 | 1/2004 |

OTHER PUBLICATIONS

Author: Dimitrios N. Tsinoglou, Grigorios C. Koltsakis, and Zissis C. Samaras; Title / Date: Evaluation of On-Board Diagnosis Methods for Three-Way Catalytic Converters / Publication Date (Web): Nov. 6, 2002; Environ. Sci. Technol., 2002, 36 (23).*

* cited by examiner

*Primary Examiner*—Thomas E Denion
*Assistant Examiner*—Jesse Bogue
(74) *Attorney, Agent, or Firm*—Collard & Roe, P.C.

(57) ABSTRACT

The invention relates to a method for diagnosing the degree of ageing of a catalyst arranged in the exhaust gas channel of an internal combustion engine, wherein the oxygen storage capacity of the catalyst is determined by means of the signals of a waste gas probe arranged upstream and downstream from the catalyst according to the OSC method when a rapid change occurs in the air/fuel ratios between a rich and lean mixture composition supplied to the internal combustion engine. The aim of the invention is to provide a method for determining the degree of ageing of a catalyst arranged in the exhaust gas channel of an internal combustion engine, wherein it is possible to ascertain the degree of ageing of a catalyst in a more accurate and more reliable manner, requiring little measurement effort. According to the invention, it is possible to determine a degree of precious metal sintering of the catalyst and a degree of damage to the wash coat structure from the respective oxygen storage capacities determined from the OSC measurement methods. By combining the two values, it is possible to determine the degree of ageing of the catalyst.

9 Claims, No Drawings

METHOD FOR DIAGNOSING THE DEGREE OF AGING OF A CATALYTIC CONVERTER DISPOSED IN THE EXHAUST GAS CHANNEL OF AN INTERNAL COMBUSTION ENGINE

CROSS REFERENCE TO RELATED APPLICATIONS

Applicants claim priority under 35 U.S.C. §119 of German Application No. 10 2005 004 670.3 filed Feb. 2, 2005. Applicants also claim priority under 35 U.S.C. §365 of PCT/DE2006/000167 filed on Feb. 1, 2006. The international application under PCT article 21(2) was not published in English.

The invention relates to a method for diagnosing the degree of aging of a catalytic converter disposed in the exhaust gas channel of an internal combustion engine, in accordance with the characteristics named in the preamble of claim 1.

Legislation requires an emission of pollutants from motor vehicles that is becoming increasingly smaller. In connection with this, the ability of the exhaust system of the motor vehicle to function properly must be constantly monitored to check whether or not the catalytic converter still possesses the conversion performance required to adhere to the exhaust gas limit values. A so-called on-board diagnostic system (OBD) in motor vehicles monitors the ability of the exhaust system to function with regard to its conversion performance for pollutants, among other things.

In the case of the present state of the art, the exhaust gas quality cannot be checked directly by means of measuring the pollutants. Therefore, one makes do with determining the oxygen storage capacity (OSC), which represents the conversion capability of the catalytic converter. Thus, for example, a method for determining the oxygen storage capacity of the catalytic converter is known from DE 42 11 116 A1, from DE 199 53 601 C2, from DE 198 01 626 A1, and from DE 103 05 452 A1, in which method an exhaust gas sensor is disposed ahead of and behind the exhaust gas catalytic converter, in each instance, which sensor is connected with an evaluation device, for example an engine control device. To determine the oxygen storage capacity of the catalytic converter, an air/fuel mixture that is different in its composition is supplied to the internal combustion engine, alternating at periodic intervals, so that an exhaust gas with excess oxygen (lean mixture composition) and an exhaust gas with oxygen deficiency (rich mixture composition) is supplied to the catalytic converter. If the engine is operated in lean manner ($\lambda>1$), a higher $O_2$ concentration is present in the exhaust gas than what corresponds to stoichiometry. The cerium in the washcoat of the catalytic converter is oxidized from the oxidation stage +3 to +4 with this excess, and a corresponding $O_2$ amount is built into the cerium oxide lattice. In this manner, oxygen is stored during the lean phases.

In rich operation ($\lambda<1$), there is an excess of CO and hydrocarbons (HC) in the exhaust gas. Now the reverse reaction of the stored $O_2$ occurs, in that primarily CO is absorbed on the precious metal, diffuses from there, on the washcoat surface, to the reactive cerium$^{4+}$ ("spill-over"), and reacts with a stored oxygen atom here, to form $CO_2$. The cerium is left behind in the oxidation stage +3.

In order to determine the oxygen storage capacity of the catalytic converter, sudden changes between a rich and a lean mixture feed are produced by the engine control device, the progression of which changes is followed by exhaust gas sensors ($\lambda$ sensors) disposed ahead of and behind the catalytic converter. Because the catalytic converter stores $O_2$ in the case of a rich/lean jump, and gives off $O_2$ in the case of a lean/rich jump and decomposes the CO/HC excess in the rich exhaust gas when doing so, the response behind the catalytic converter is registered with a time delay by the exhaust gas sensor that follows the catalytic converter. The storage of $O_2$ or the release of $O_2$, respectively, continues to occur until the $O_2$ storage unit has been completely filled or emptied, respectively. The time delay in the jump response behind the catalyst is therefore a measure of the oxygen storage capacity of the catalytic converter (OSC). The $\lambda=1$ passage of the sensor voltage is preferably used to establish the point in time of the jump, in each instance. The decrease in the oxygen storage capacity down to a certain value is evaluated by the vehicle electronics as impermissible damage to the catalytic converter and therefore as an error that must be reported.

It is a disadvantage in the determination of the oxygen storage capacity of the catalytic converter according to the state of the art as described that this method contains error sources with regard to the accuracy of the actual state of the catalytic converter. For example, it is possible that aging of the catalytic converter leads to a deterioration in the precious metal activity, but not to a decrease in oxygen storage capacity. It might occur that the pollutant limit values are exceeded, but this would remain hidden and no error message would be given.

On the other hand, there can be catalytic converters that lose a great deal of oxygen storage capacity, but nevertheless continue to convert sufficiently. The error reported by the on-board diagnostic system in this case would result in replacing an intact catalytic converter, and this is inefficient.

A method with which aging of the storage catalytic converter can be recognized is known from DE 101 37 134 B4. In this connection, a diagnosis for recognizing the aging of the catalytic converter is carried out as a function of the temperature determined at a partial-load operating point of the internal combustion engine. The temperature is measured in and/or behind the catalytic converter, whereby the temperature or a temperature increase determined from it, respectively, changes as a function of the aging of the catalytic converter. The lower the conversion ability of the catalytic converter, which has been reduced due to aging, the lower the temperature increase. Therefore a conclusion is drawn concerning the aging status of the catalytic converter, on the basis of the temperature increase.

A disadvantage of this method is that the determination of the aging of the catalytic converter as a function of its temperature is also greatly subject to errors. A precise degree of aging of the catalytic converter and conclusions concerning the possible cause of premature aging cannot be implemented using this method. Furthermore, a precise temperature determination of the catalytic converter is difficult to carry out.

The invention is based on the task of creating a method for determining the degree of aging of a catalytic converter disposed in the exhaust gas channel of an internal combustion engine, with which the degree of aging of a catalytic converter can be assessed more precisely and more reliably, with little measurement effort.

This task is accomplished, according to the invention, by means of the characterizing features of claim 1.

It is possible to determine a reliable value for the degree of aging of the catalytic converter by means of linking the degree of precious metal sintering of the catalytic converter with the degree of the damage status of the washcoat structure of the catalytic converter, which are determined from the oxygen storage capacity of the catalytic converter, in each instance, with little measurement effort. Error sources with regard to the possibility that the pollutant limit value of the catalytic converter has been exceeded, or with regard to an incorrect interpretation of the actual degree of aging of the catalytic converter, are avoided in this manner, to the greatest possible extent.

In the following, the invention will be explained in greater detail using an exemplary embodiment.

The determination of the oxygen storage capacity (OSC determination) of the catalytic converter takes place using the evaluation of the signals of the exhaust gas sensors disposed ahead of and behind the catalytic converter ($\lambda$ sensors) in the case of a rich/lean jump and in the case of a lean/rich jump of the air/fuel ratios supplied to the internal combustion engine. In this connection, it has been shown that the lean/rich OSC decreases significantly more strongly than the rich/lean OSC over the course of aging of the catalytic converter, due to the different mechanisms of the catalytic converter for $O_2$ storage and for $O_2$ release.

Because filling of the $O_2$ storage unit in the case of the rich/lean OSC takes place directly by way of the border surface gas phase/washcoat, the rich/lean OSC is quite stable with regard to aging, i.e. it remains almost constant, even if the precious metal has already lost a lot of conversion performance due to so-called sintering. The rich/lean OSC only drops, as well, if high temperatures damage the washcoat structure.

In the case of the lean/rich OSC, on the other hand, the speed of the reaction of CO with stored oxygen ($O^{2-}$) is significantly determined by the diffusion process from the precious metal to the cerium$^{4+}$ that is distributed over the entire washcoat. The average distance that must be overcome in the case of this diffusion is proportional to the average distance between the precious metal particles. If these have been greatly sintered due to aging, the average distance between them clearly becomes greater, because the entire amount of precious metal is concentrated in fewer and larger particles. As a result, the CO diffusion from the metal particles to the oxygen stored on the entire washcoat surface takes significantly longer, and the reaction $CO+2Ce^{4+}+O^{2-} \rightarrow CO_2+2Ce^{3+}$ becomes slower. Because of this slowdown of the CO reaction, the CO concentration behind the catalytic converter increases more rapidly than would be expected according to the "true OSC." After a lean/rich jump, the $\lambda=1$ point is already reached before the $O_2$ storage unit has been completely emptied. The remaining oxygen then finishes reacting slowly, until the next rich/lean jump occurs. After this jump, the storage unit is completely filled again, and the complete rich/lean OSC is measured.

The conditions described show that the decrease in the lean/rich OSC is a direct measure of the sintering of the precious metal and therefore also for the damage to the catalytic converter. However, since the oxygen storage capacity is also a function of the temperature, the absolute value of the lean/rich OSC cannot be used directly for the on-board diagnostic system. According to the invention, the degree of precious metal sintering of the catalytic converter is determined from the quotient of the current oxygen storage capacity of the catalytic converter in the case of a sudden change from a lean to a rich mixture composition and the current oxygen storage capacity of the catalytic converter in the case of a sudden change from a rich to a lean mixture composition. As a measure of the "residual" conversion activity of the catalytic converter, the quotient $R_{EmKat}$ is:

$$R_{EmKat} = \frac{\text{lean} - \text{rich} - OSC\,(\text{old})}{\text{rich} - \text{lean} - OSC\,(\text{old})}$$

With this measure, the degree of precious metal sintering is explicitly expressed as $$Ems_{Kat}=1-R_{EmKat}$$

which is mainly responsible for the loss in activity of the aged catalytic converter.

Where the limit value of $R_{EmKat}$ lies, at which the catalytic converter must be replaced, depends on the type of catalytic converter and also on the overall type of vehicle. It must therefore be determined in long-term running experiments, which are always carried out, in any case.

Since washcoat damage can also occur, under certain circumstances, which also causes the rich/lean OSC to decrease, the damage status of the washcoat structure is determined as an additional criterion. This is determined from the quotient of the current oxygen storage capacity of the catalytic converter in the case of a sudden change from a rich to a lean mixture composition and the oxygen storage capacity of an unstressed catalytic converter in the case of a sudden change from a rich to a lean mixture composition. As a measure of the "residual" OSC of the catalytic converter, the quotient $R_{OSCKat}$ is:

$$R_{OSCKat} = \frac{\text{rich} - \text{lean} - OSC\,(\text{old})}{\text{rich} - \text{lean} - OSC\,(\text{fresh})}$$

With this measure, the degree of washcoat damage is explicitly expressed as $$Wcs_{Kat}=1-R_{OSCKat}$$

In this connection, the oxygen storage capacity of a new catalytic converter, which has not yet been impacted with pollutants and still possesses its complete conversion performance, is determined in the case of a sudden change from a rich to a lean mixture composition. This value is stored in the memory of a control device, preferably in the engine control device of the internal combustion engine, and called up from the memory to determine the current degree of the damage status of the washcoat structure and of the degree of aging of the catalytic converter, and used accordingly.

In order to determine the degree of aging of the catalytic converter, the determined degree of precious metal sintering of the catalytic converter is linked with the determined degree of the damage status of the washcoat structure of the catalytic converter, by means of an OR logic or any other logical or mathematical relation.

Suitable sum or product formations from the degree of precious metal sintering of the catalytic converter and the determined degree of the damage status of the washcoat structure have proven to be particularly advantageous to determine the degree of aging of the catalytic converter. The degree of aging of the catalytic converter ($Alt_{Kat}$) results, for example, as:

$$Alt_{Kat}=Ems_{Kat}+Wcs_{Kat} \qquad \text{Variant 1}$$

$$Alt_{Kat}=1-R_{EmKat} \times R_{OSCKat} \qquad \text{Variant 2}$$

Written out, this results in:

$$Alt_{Kat} = \left(1 - \frac{\text{lean} - \text{rich} - OSC(\text{old})}{\text{rich} - \text{lean} - OSC(\text{old})}\right) + \left(1 - \frac{\text{rich} - \text{lean} - OSC(\text{old})}{\text{rich} - \text{lean} - OSC(\text{fresh})}\right) \quad \text{Variant 1}$$

$$Alt_{Kat} = 1 - \frac{\text{lean} - \text{rich} - OSC(\text{old})}{\text{rich} - \text{lean} - OSC(\text{fresh})} \quad \text{Variant 2}$$

In the case of a new catalytic converter that has not yet been impacted with pollutants and still has its complete conversion performance, $Alt_{Kat} \approx 0$ and increases with the ongoing performance, both in the case of metal sintering and in the case of washcoat damage.

A threshold value of the permissible degree of aging of the catalytic converter that is typical for every catalytic converter is determined in known manner, by means of long-term running experiments, and stored in the memory of a control device. The degree of aging of the catalytic converter that is actually determined is compared with the threshold value in memory, whereby it serves as a measure for the need to replace the catalytic converter if the permissible threshold value is exceeded. The degree of aging of the catalytic converter that is actually determined can also be displayed by the control device, by way of a display on the dashboard.

The degree of aging determined in this manner provides significantly more reliable values for assessing the aging of the catalytic converter than what would be possible with the method described in the state of the art. Another advantage of the solution according to the invention consists in the fact that no increased measurement effort is required to determine the status of aging.

The invention claimed is:

1. Method for diagnosing the degree of aging of a catalytic converter disposed in the exhaust gas channel of an internal combustion engine, whereby the oxygen storage capacity of the catalytic converter is determined by means of the signals of an exhaust gas sensor disposed ahead of and behind the catalytic converter in the case of sudden change of the air/fuel ratios supplied to the internal combustion engine, between a rich and a lean mixture composition, wherein the damage to the conversion activity due to precious metal sintering of the catalytic converter and the damage status of the washcoat structure of the catalytic converter are determined from the oxygen storage capacities of the catalytic converter that are determined, in each instance, and the degree of aging of the catalytic converter is determined by linking the two values.

2. Method according to claim 1, wherein the damage to the conversion activity and from that, the degree of precious metal sintering of the catalytic converter, is determined from the quotient of the current oxygen storage capacity of the catalytic converter in the case of a sudden change from a lean to a rich mixture composition and the current oxygen storage capacity of the catalytic converter in the case of a sudden change from a rich to a lean mixture composition, standardized to 1.

3. Method according to claim 1, wherein the degree of the damage status of the washcoat structure of the catalytic converter is determined from the quotient of the current oxygen storage capacity of the catalytic converter in the case of a sudden change from a rich to a lean mixture composition and the oxygen storage capacity of an unstressed catalytic converter in the case of a sudden change from a rich to a lean mixture composition, standardized to 1.

4. Method according to claim 1, wherein the degree of aging ($Alt_{Kat}$) of the catalytic converter is determined from the sum of the degree of precious metal sintering of the catalytic converter and the degree of the damage status of the washcoat structure of the catalytic converter according to the formula $$Alt_{Kat} = 1 - \left(\frac{\text{lean} - \text{rich} - OSC(\text{old})}{\text{rich} - \text{lean} - OSC(\text{old})}\right) + \left(1 - \frac{\text{rich} - \text{lean} - OSC(\text{old})}{\text{rich} - \text{lean} - OSC(\text{fresh})}\right).$$

5. Method according to claim 1, wherein the degree of aging ($Alt_{Kat}$) of the catalytic converter is determined from the product of the damage to the conversion activity due to precious metal sintering of the catalytic converter and the damage status of the washcoat structure of the catalytic converter, according to the formula $$Alt_{Kat} = 1 - \frac{\text{lean} - \text{rich} - OSC(\text{old})}{\text{rich} - \text{lean} - OSC(\text{fresh})}.$$

6. Method according to claim 1, wherein the fact that a threshold value of the degree of aging of the catalytic converter has been exceeded serves as a measure for the need to replace the catalytic converter.

7. Method according to claim 1, wherein the oxygen storage capacity of a new catalytic converter being put into use is determined in the case of a sudden change from a rich to a lean mixture composition, and stored in the memory of a control device for determining the current degree of the damage status of the washcoat structure and the degree of aging of the catalytic converter, in each instance.

8. Method according to claim 1, wherein the linking of the degree of precious metal sintering of the catalytic converter with the degree of the damage status of the washcoat structure of the catalytic converter takes place by means of an OR logic or any desired other logical or mathematical relation.

9. Method according to claim 1, wherein the degree of aging of the catalytic converter is displayed by way of a control device.

\* \* \* \* \*